(12) United States Patent
Bornhorst

(10) Patent No.: US 9,127,965 B2
(45) Date of Patent: Sep. 8, 2015

(54) GOBO WHEEL LOCATION DRIVE

(71) Applicant: Production Resource Group, LLC, Windsor, NY (US)

(72) Inventor: James Bornhorst, Desoto, TX (US)

(73) Assignee: Production Resource Group, LLC, New Windsor, NY (US)

( * ) Notice: Subject to any disclaimer, the term of this patent is extended or adjusted under 35 U.S.C. 154(b) by 0 days.

(21) Appl. No.: 14/674,317

(22) Filed: Mar. 31, 2015

(65) Prior Publication Data

US 2015/0204693 A1 Jul. 23, 2015

Related U.S. Application Data

(60) Division of application No. 13/418,557, filed on Mar. 13, 2012, now Pat. No. 8,994,368, which is a continuation of application No. 12/942,618, filed on Nov. 9, 2010, now Pat. No. 8,132,473, which is a continuation of application No. 12/546,821, filed on Aug. 25, 2009, now Pat. No. 7,830,139, which is a continuation of application No. 11/777,006, filed on Jul. 12, 2007, now Pat. No. 7,578,204.

(60) Provisional application No. 60/830,773, filed on Jul. 13, 2006.

(51) Int. Cl.
| | |
|---|---|
| G01B 7/30 | (2006.01) |
| F21V 17/02 | (2006.01) |
| F21V 19/02 | (2006.01) |
| G01D 5/14 | (2006.01) |
| G01D 5/347 | (2006.01) |

(52) U.S. Cl.
CPC ............. G01D 5/14 (2013.01); G01D 5/3473 (2013.01)

(58) Field of Classification Search
USPC .................................................... 324/207.25
See application file for complete search history.

(56) References Cited

U.S. PATENT DOCUMENTS

| | | |
|---|---|---|
| 5,791,755 A | 8/1998 | Henry et al. |
| 5,934,794 A | 8/1999 | Hutton |
| 6,079,853 A | 6/2000 | Evans |
| 6,256,136 B1 | 7/2001 | Hunt |
| 6,601,973 B2 | 8/2003 | Ramussen et al. |
| 6,622,053 B1 | 9/2003 | Hewlett et al. |
| 8,132,473 B2 | 3/2012 | Bornhorst |

*Primary Examiner* — Bot Ledynh

(57) ABSTRACT

A gobo wheel with automatic detection system that automatically detects a rotational position of the gobo. The rotational position can be detected by a magnetic marking system. Each of the gobos can be randomly placed within the holder. The position of the gobos can be automatically determined during a start up routine for example, and then those positions can be stored and used for later determination of a position.

14 Claims, 2 Drawing Sheets

GOBO WHEEL LOCATION DRIVE

CROSS-REFERENCE TO RELATED APPLICATIONS

This is a divisional of Ser. No. 13/418,557 filed Mar. 13, 2012, now U.S. Pat. No. 8,994,368 issued Mar. 31, 2015, which is a continuation of Ser. No. 12/942,618 filed Nov. 9, 2010, now U.S. Pat. No. 8,132,473 issued Mar. 13, 2012, which is a continuation of Ser. No. 12/546,821, filed Aug. 25, 2009, now U.S. Pat. No. 7,830,139 issued Nov. 9, 2010, which is a continuation of Ser. No. 11/777,006, filed Jul. 12, 2007, now U.S. Pat. No. 7,578,204 issued Aug. 25, 2009. This application also claims priority to U.S. Provisional Application 60/830,773, filed Jul. 13, 2006, the disclosures of these parent applications are hereby incorporated by reference, in their entirety.

BACKGROUND

A gobo is a device that shapes light. Many lighting devices use a holder for multiple gobos. The holder allows selection of one of the gobos to be placed into the beam of the light beam. It also allows simultaneous rotation of all these gobos, including the one in the light beam.

For example, U.S. Pat. No. 5,402,326 shows a device with a gobo wheel, having five gobos and an open hole thereon. The gobo wheel holds the five gobos, and the gobo wheel is rotatable to allow any of the five gobos to be placed within the "optical train", which is the train of light that passes from the light bulb to the output beam of the light. In addition, the gobo wheels are rotatable as part of an effect of a rotating gobo. The central gear arrangement causes all of the gobos to be rotated simultaneously. When the central gear is actuated, each of the five gobos simultaneously rotate.

SUMMARY

The present application teaches a system which allows calibration of the gobos and their current positions.

BRIEF DESCRIPTION OF THE DRAWINGS

These and other aspects will now be described in detail with reference to the accompanying drawings, wherein.

DETAILED DESCRIPTION

The general structure and techniques, and more specific embodiments which can be used to effect different ways of carrying out the more general goals, are described herein.

The inventor noticed a problem that existed in gobo wheels of this type. The gobo elements need to be placed on the wheel, and need to be replaceable. However, the orientation of the gobo is very important for properly locating the gobo based on a remote command. The gobo wheels are often placed in their desired orientation. However, if the orientation is incorrect when placed, then the gobo wheels may be out of sync relative to the control.

Figure 1:
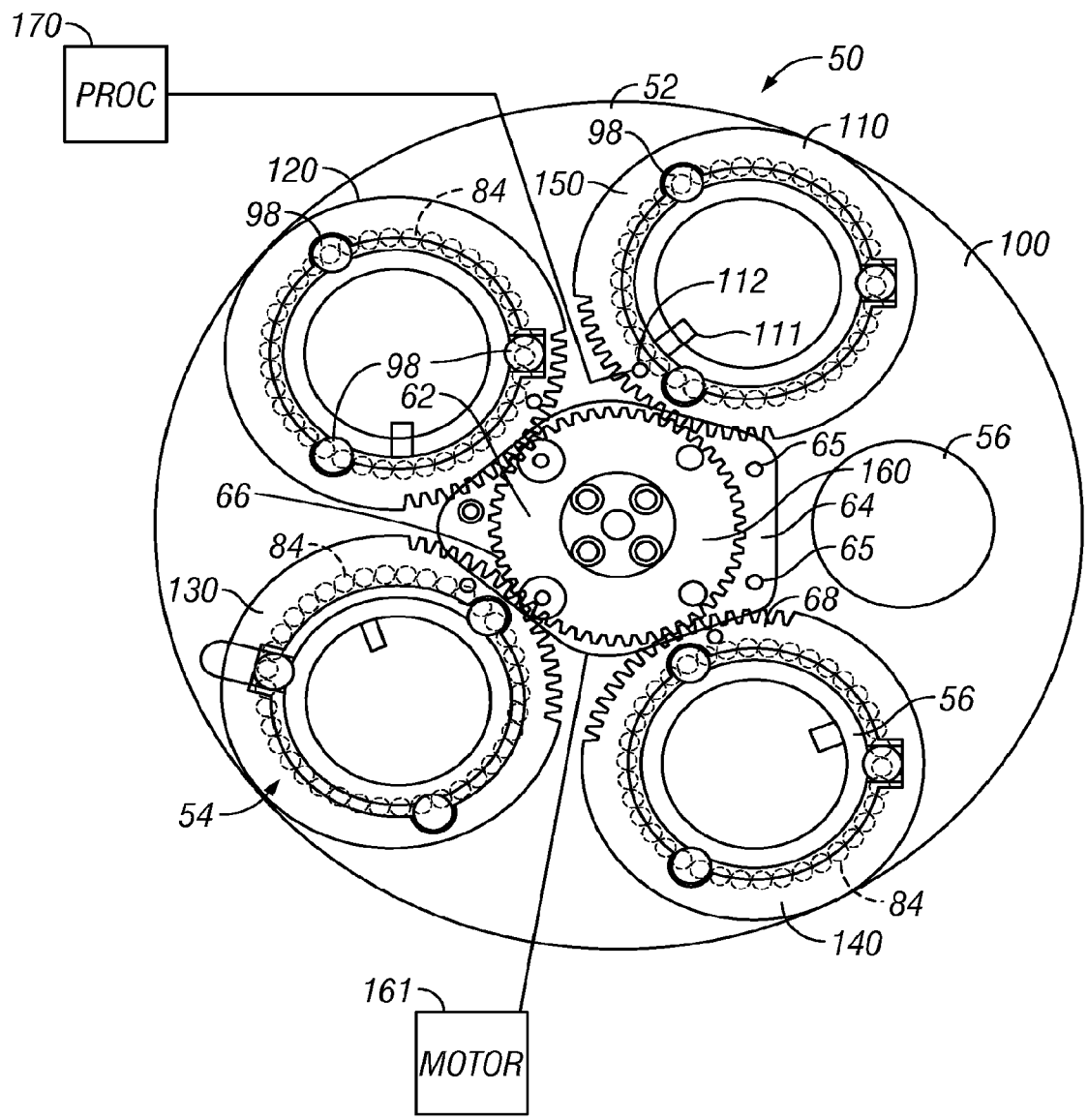
FIG. 1 illustrates an embodiment.

FIG. 1 illustrates an embodiment. Gobo wheel 100 includes a plurality of gobo elements 110, 120, 130, 140 thereon. Each of the gobo elements includes a toothed outer surface 150, which interacts with a central sun gear 160. The sun gear is driven by a motor shown as 161. The sun gear can be driven in either the clockwise or counterclockwise directions to rotate each of the gobo wheels 110-140 simultaneously.

Each of the gobo wheels 110-140 includes a sensor part thereon. Gobo wheel 110 includes sensor part 111. In this embodiment, the sensor part may be a magnet. The magnet is located at a point on the gobo wheel known as position 0. This is a point where the gobo wheel is either upright, or alternatively in a specified position. Each of the gobo wheel locations also includes a detector part 112 which detects the sensor.

In the case of a magnet, the detector may be simply a magnetically actuatable set of contacts which is closed by contact with the magnet. Such contacts are conventional, and are well-known, for example, in the alarm industry. Each of the sensors 112 is connected to a processing part 170. The processing part 170 may also control the operation of the rotation of the wheel 100 as well as the rotation of the sun gear 160.

Figure 2:
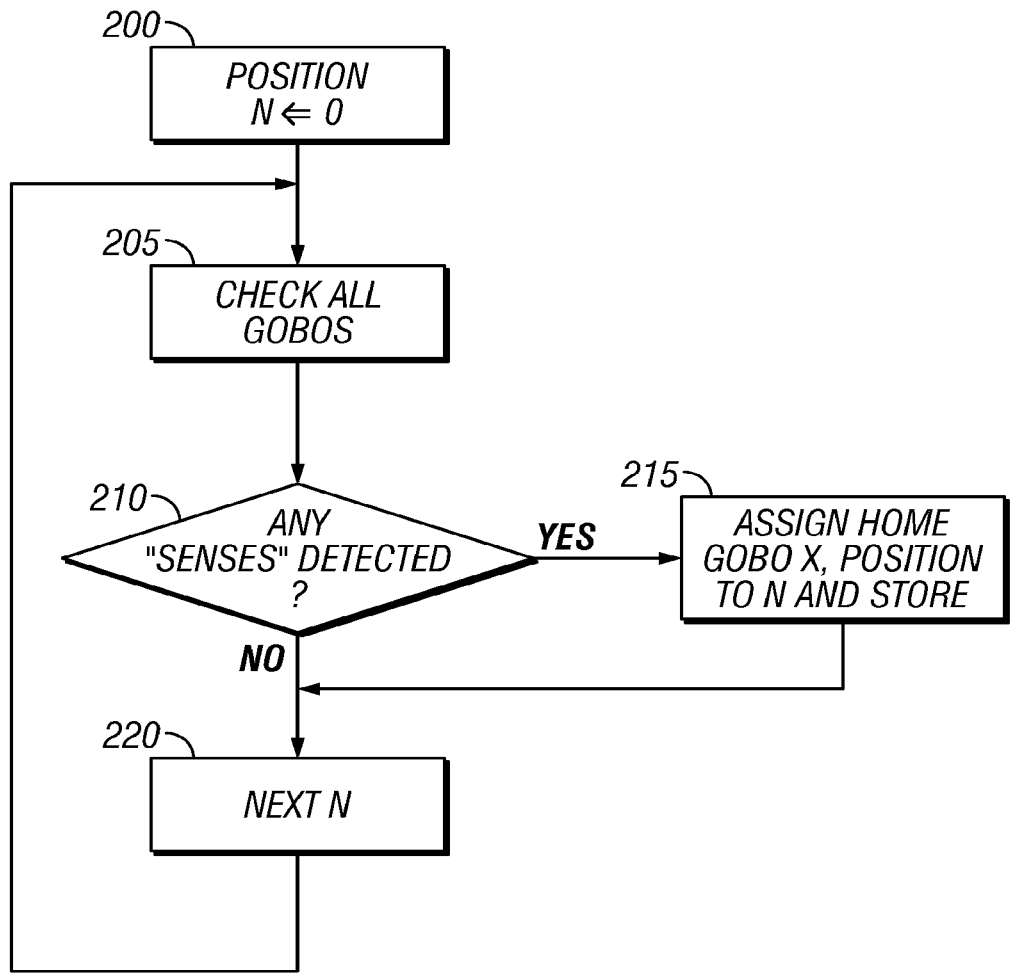
FIG. 2 illustrates a flow diagram.

The processor initially runs through a calibration routine which follows the steps of the flowchart of FIG. 2. The operation begins by assigning a current position of each gobo as position 0 at 200. This current position can be effectively random, since the position will be determined via the routine. A variable n is set to 0 at 200.

Each of the five gobos are checked at 205 to determine if any instances of sensing are detected at 210. A sense is detected at 210 when one of the sensors 111 is directly adjacent to one of the detectors 112. When this sense occurs, happens, the gobo is in its "home" position. For gobo x, here a gobo 110, the home position variable is assigned to n, and the value is stored at 215. This value now represents the actual position of the gobo as placed in the holder.

The next n is then obtained at 220, and the process repeats. The system indexes through each of the positions, and therefore obtains an offset for each of the home positions.

For example, the system knows that at any given time, a specified position of the sun gear will represent the home position of the gobo 110. The system knows the specified home position for each of the other gobos also. For any desired gobo position, therefore, the processor 170 can simply add an offset related to the home position value, and obtain the exact position of the gobo.

This system may be advantageous since the gobos can be placed in any random orientation into the gobo wheel 100. Alternatively, one can either place or try to place each of the gobo wheels into the calibrated positions, and use the routine of FIG. 2 to determine if they are, in fact, in a calibrated position. The calibration routine can be carried out at each specified amount of time, or when the gobo wheel is replaced or reoriented or on restart.

The above has described the sensors being magnetic, but it should be understood that the sensors can also be optical detection, for example, using a photo diode or infrared diode to detect an optical mark, or can be any other type of proximity sensor.

In addition, while the above has described the use of a specified sun gear arrangement, it should be understood that the above can be used for any gobo calibration sequence. More or fewer than five gobos may be on any gobo wheel, and multiple wheels may also be oriented and calibrated in this way.

The above has described a routine that indexes through all the gobos to carry out a calibration, but it should be understood that any single device can be calibrated in this way.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other rotatable devices, such as color wheels, may be calibrated in this way.

The computers described herein may be any kind of computer, either general purpose, or some specific purpose computer such as a workstation. The computer may be a Pentium class computer, running Windows XP or Linux, or may be a Macintosh computer. The programs may be written in C, or Java, or any other programming language. The programs may be resident on a storage medium, e.g., magnetic or optical, e.g. the computer hard drive, a removable disk or other removable medium. The programs may also be run over a network, for example, with a server or other machine sending signals to the local machine, which allows the local machine to carry out the operations described herein.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method, comprising:
    using a computer for automatically determining a first rotational orientation of a rotatable gobo as part of a calibration routine;
    storing information in the computer indicative of said orientation that was automatically determined;
    receiving a command to rotate said gobo to a desired rotational orientation; and
    rotating said gobo to said desired rotational orientation by determining a rotation relative to said first rotational orientation.

2. The method as in claim 1, further comprising automatically determining said first rotational orientation for a replaced gobo, where said rotatable gobo can be replaced in any orientation.

3. The method as in claim 1, further comprising using said computer for controlling multiple gobos, and further comprising rotating all of said multiple gobos simultaneously based on said commands.

4. The method as in claim 1, wherein said determining the first rotational orientation comprises detecting a location of a mechanical structure on the rotatable gobo being at said first rotational orientation.

5. The method as in claim 4, wherein said determining uses a magnetic detection to detect a magnetically detectable part.

6. The method as in claim 4, wherein said determining uses an optical detection to detect an optically detectable part.

7. The method as in claim 3, wherein said determining the first rotational orientation comprises detecting home positions of each gobo.

8. The method as in claim 3, further comprising using a lamp to project light along an axis, and said gobos are in a gobo holder that rotates such that one of said gobos is on said axis.

9. The method as in claim 8, wherein each of multiple gobos rotate based on a common rotation source and where there is a single gobo rotation motor that rotates each of said multiple gobos.

10. The method as in claim 8, wherein said multiple gobos are mounted on a surface, further comprising using a rotation motor to commonly rotate all of said gobos using a gear which is on said surface and rotated by said rotation motor, to rotate said multiple gobos, and where each of said gobos have a surface that is rotated by said gear.

11. A method of operating a light comprising:
    projecting light along an axis;
    locating a gobo holder along the axis which has multiple gobos therein;
    rotating the gobo holder, based on a received command, to locate one of said multiple gobos along the axis and in the light;
    based on a command to rotate the gobo in the light, rotating all of the multiple gobos;
    using a detection part in said one gobo to automatically detect said one specific orientation of said gobo, in only one orientation of said gobo and where said detection part does not detect said orientation of said gobo in any other orientation other than in said one specific orientation; and
    rotating all of said gobos in order to move said one gobo to a desired rotation orientation relative to said one specific orientation.

12. The method as in claim 11, wherein said command is created from a processor that controls said detection, receives information indicative of said one specific orientation, and controls storing information indicative of said one specific orientation.

13. The method as in claim 11, wherein said detection part is magnetically detectable.

14. The method as in claim 11, where said detection part is optically detectable.

* * * * *